T. J. E. ROBERTS AND H. G. BELGROVE.
SELF PROPELLED PLOW AND OTHER AGRICULTURAL MACHINE.
APPLICATION FILED NOV. 1, 1918.
1,372,454.
Patented Mar. 22, 1921.
2 SHEETS—SHEET 1.
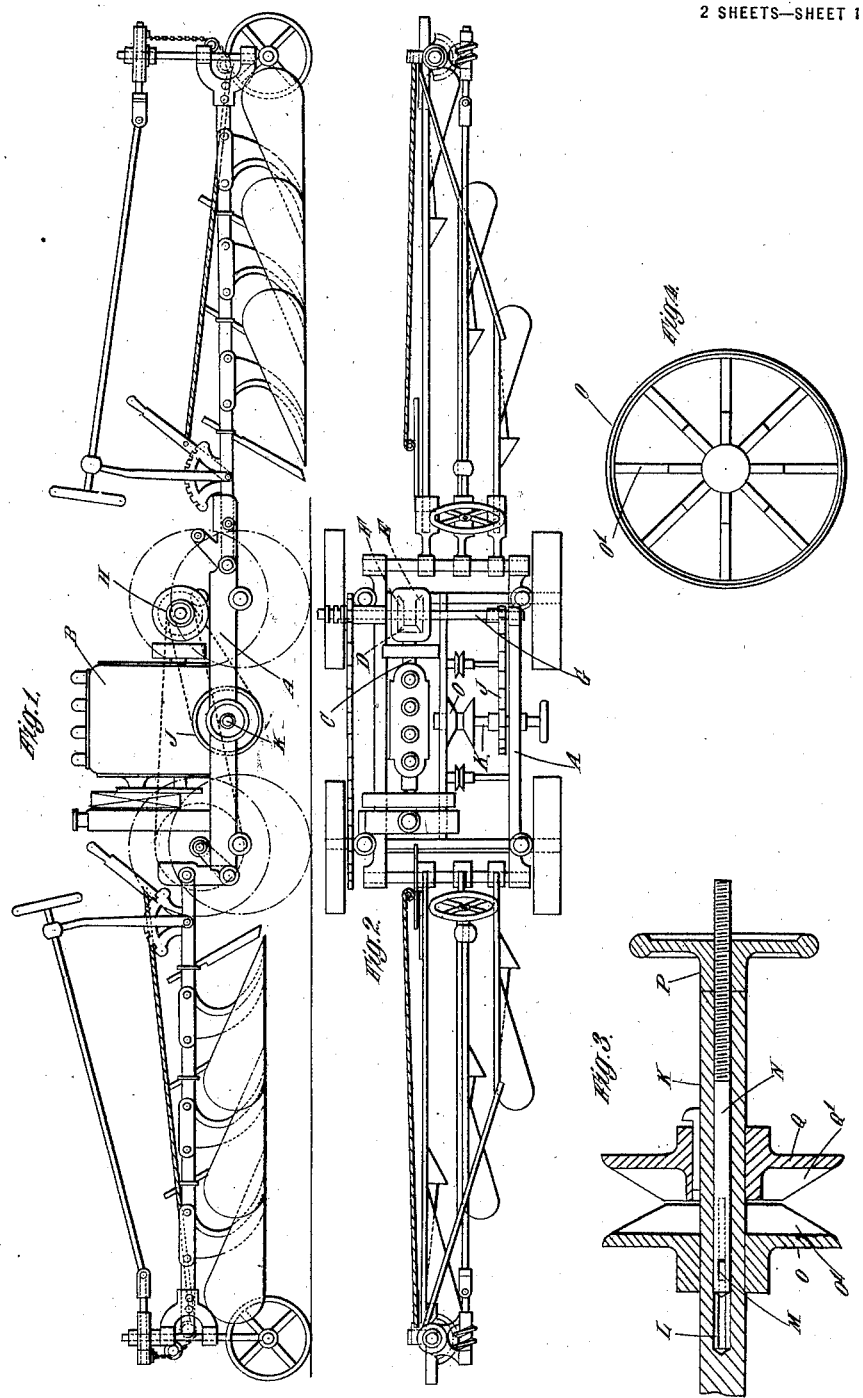
INVENTORS THOMAS J. E. ROBERTS & HENRY G. BELGROVE,
by Clifford E. Dunn
Attorney.

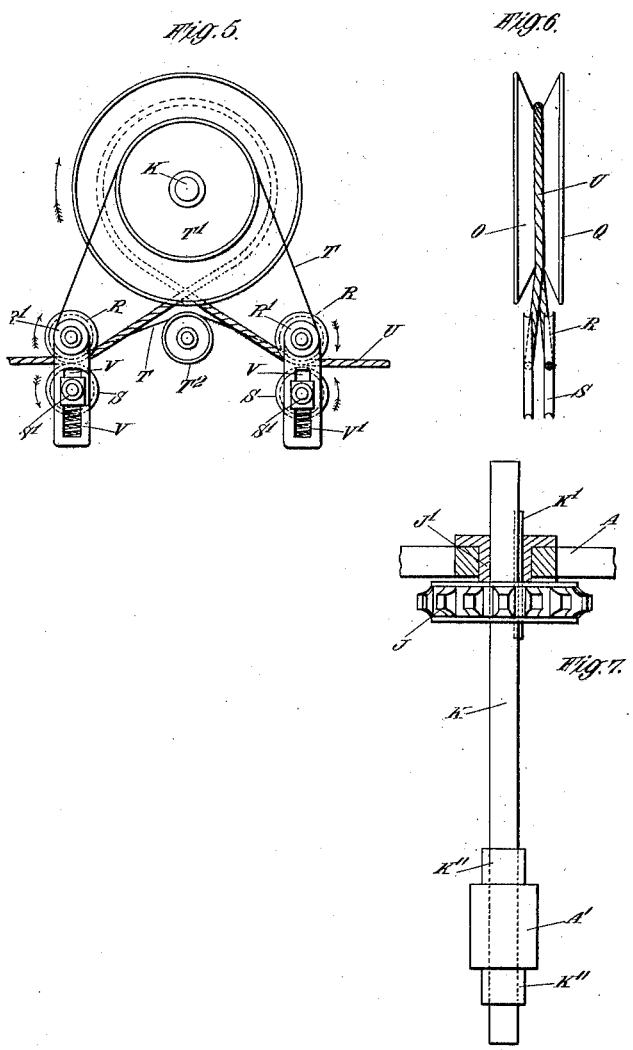

UNITED STATES PATENT OFFICE.

THOMAS JOHN EDWIN ROBERTS, OF STONY STRATFORD, AND HENRY GEORGE BELGROVE, OF DENTON, ENGLAND.

SELF-PROPELLED PLOW AND OTHER AGRICULTURAL MACHINE.

1,372,454.      Specification of Letters Patent.    Patented Mar. 22, 1921.

Application filed November 1, 1918. Serial No. 260,725.

*To all whom it may concern:*

Be it known that we, THOMAS JOHN EDWIN ROBERTS and HENRY GEORGE BELGROVE, both subjects of the King of Great Britain, residing, respectively, at Stony Stratford, in the county of Bucks, England, and at Denton, in the county of Northampton, England, have invented new and useful Improvements in Self-Propelled Plows and Other Agricultural Machines, of which the following is a specification.

This invention relates to self-propelled plows and other agricultural machines, such as seed drills, disk-harrows, and the like, which are required at each traverse of a field to move along a new line parallel to that previously traversed.

The present invention has for its primary object to provide improved means for the traction of the machine over the land without relying on the tractive force of its own wheels.

According to our invention, in order to enable the machine to be drawn over the land at different speeds by means of a cable, rope, chain, or the like, anchored at its ends, there is provided, on a shaft driven by a motor (*e. g.* an internal combustion engine) mounted on the machine, a capstan drum of variable diameter, so that with a constant speed of the motor the speed of the machine can be carried by varying the diameter of the capstan. The variable diameter capstan may be advantageously formed in halves, each having a series of inclined radial members spaced apart so that the members of one half are capable of fitting between the members of the other half as the halves are moved toward or away from each other and thereby together forming a V-groove to receive the anchored rope or cable, such groove having its largest diameter when the halves are closest together and its smallest diameter when the halves are farthest apart. When the drum is at its smallest diameter, the rate of travel of the machine is a minimum and when the drum is at its largest diameter, the rate of travel of the machine is a maximum.

In combination with the variable-diameter capstan drum there is provided a device for insuring that the part of the rope or cable wrapped around the drum shall be under sufficient tension to prevent slip. For this purpose, the cable at a short distance on each side of the capstan passes between the members of a pair of friction-pulleys, which are yieldingly pressed together *e. g.* by springs, and of which one member of each pair is driven, *e. g.* by a chain and sprocket wheels, from the capstan or capstan shaft at a peripheral speed slightly greater than that of the machine relatively to the cable or rope. By this means, the cable or rope is kept taut from the anchorage to a point just behind the capstan drum and is consequently wrapped sufficiently tightly around the drum to permit of an efficient drive.

The changing of the plow or other frames when the machine reaches the headlands can be effected in any suitable manner for example by the motor through suitable trip gear as described in our application for Patent Serial No. 260,726, filed November 1, 1918, being worked straight across the field.

We furthermore provide means for moving the capstan transversely out of the center line of the chassis so as to enable the point of draft to be adjusted to pull the machine.

The capstan in either case may be advantageously driven through a gear box comprising a pair of bevel gears driven by the motor through pinions controlled by a jaw clutch which, by engaging with one bevel wheel or the other, reverses the direction of rotation of a shaft that is connected, *e. g.* by chain and sprocket gear, to the capstan shaft. Between the engine and the bevel gearing there is preferably arranged a friction clutch which has foot controls at either end of the plow. This imparts motion to the same. The steering is done by means of one of the wheels on the chassis which runs for preference on the land, through a worm and sector mounted on the vertical axis, carrying the spindle upon which the wheel rotates. By a hand wheel placed at either end of the plow the direction of travel can be regulated.

In the accompanying drawings, we have shown how our said invention may be conveniently and advantageously carried into practice.

Figure 1 is a side elevation and Fig. 2 a plan, showing a plow having our said invention applied thereto.

Figs. 3 and 4 are respectively a longitudinal section and an end elevation of the variable diameter capstan.

Fig. 5 is a side elevation, and Fig. 6 an end elevation of the capstan showing the tensioning mechanism for the haulage rope or cable.

Fig. 7 is a plan illustrating means for adjusting the capstan laterally.

In the plow shown in Figs. 1 to 7, A is the chassis of the plow, on which there is mounted an internal-combustion engine or other suitable motor B having a driving shaft C that bears a bevel pinion D. Into engagement with this pinion there can be brought one or the other of a pair of bevel wheels E, F, which are movable along, but rotate with, a shaft G that is connected by chain and sprocket gear H, J, with the capstan shaft K. By sliding the wheels E, F, axially in one direction or the other, the direction of rotation of the shafts G, K, can be reversed as desired.

The capstan shaft K, see Fig. 3, is made tubular with longitudinal slots L, L, in which slides a cotter M that connects an internal screw-threaded rod N with a disk O having inclined radial projections O', O', so that the rod N and disk O can be moved simultaneously by turning a nut P that is arranged at the end of the capstan shaft K and engages the screw-thread on the rod N. The projections O', O' are adapted to fit between similar but oppositely arranged projections Q', Q', on a disk Q fixed on the shaft K. By moving the disk O axially as above described, the annular V-groove formed by the inter-engaging inclined projections O', O', Q', Q' can be varied in diameter as required.

The lateral adjustment of the capstan is effected by mounting its driving sprocket J on a tubular shaft J' (Fig. 7) having a keyway in its interior, in which slides a feather K' on the capstan shaft K, that can be secured in any desired position in the tubular shaft J' and in its bearing A' by means of collars K'', K'' fixed thereon by set-screws or in any other suitable manner.

In front and rear of the capstan O, Q, there are arranged pairs of friction pulleys, R, S, R, S, (Figs. 5 and 6) of which the pulleys R, R, are driven by means of sprocket pinions R' R' and a chain T from a sprocket wheel T' on the capstan shaft K. The chain T preferably passes over an idler pulley T², so as to increase the lap of the chain around the sprocket pinions R' R'. The pulleys S, S, are mounted to turn in bearings S', S' which are adapted to slide in guides V, V and are acted upon by springs V', V' so as to enable the pulleys S, S, to press the anchored rope or cable U against the friction pulleys R, R. The plane of one pair of pulleys R, S, is displaced laterally relatively to the plane of the other pair, as shown in Fig. 6, so as to prevent the parts of the rope or cable U on opposite ends of the convolution of such rope or cable extending around the capstan O, Q, from rubbing against such other. The sprockets R' T' are so proportioned that the peripheral velocity of the friction pulleys, R, R is greater than that of the rope or cable U, and thus the latter is kept in close contact with the bottom of the groove formed in the capstan by the inter-engaging inclined projections O', Q' so as to prevent slip taking place between the cable and capstan.

Having now particularly described and ascertained the nature of our said invention and in what manner the same is to be performed, we declare that what we claim is:—

1. In a self-propelled plow, a motor, a tubular shaft adapted to be driven by said motor, a variable diameter capstan on said shaft, said capstan comprising relatively movable halves, and a series of inclined radial members spaced apart on each of said halves, a screw-threaded rod slidable in said tubular shaft, a combined hand wheel and nut engaging the screw-thread on said rod and adapted to slide said rod, and a cotter passing through slots in said tubular shaft and apertures in one of said halves and in said screw-threaded rod, substantially as set forth.

2. In a self-propelled plow a motor, a capstan shaft, a variable diameter capstan on said capstan shaft and means for driving said capstan by said motor in either direction, said means comprising a pair of bevel gears, a shaft upon which said bevel gears are slidable but not rotatable, a gear wheel on said shaft, a gear wheel on said capstan shaft, means for connecting said gear wheels and means for sliding said bevel gears, substantially as set forth.

3. In a self-propelled plow, a motor, a variable diameter capstan adapted to be driven by said motor and friction pulleys adjacent said capstan also driven by said motor.

4. In a self-propelled plow, a motor, a variable diameter capstan adapted to be driven by said motor, friction pulleys adjacent said capstan also driven by said motor, and spring-supported pulleys adjacent said friction pulleys, said friction pulleys and said spring-supported pulleys being adapted to grip a rope before and after the passage of the latter around said capstan substantially as set forth.

THOMAS JOHN EDWIN ROBERTS.
HENRY GEORGE BELGROVE.